(No Model.)   2 Sheets—Sheet 1.
J. McCARTHY.
PAD FOR HORSESHOES.
No. 540,399.  Patented June 4, 1895.
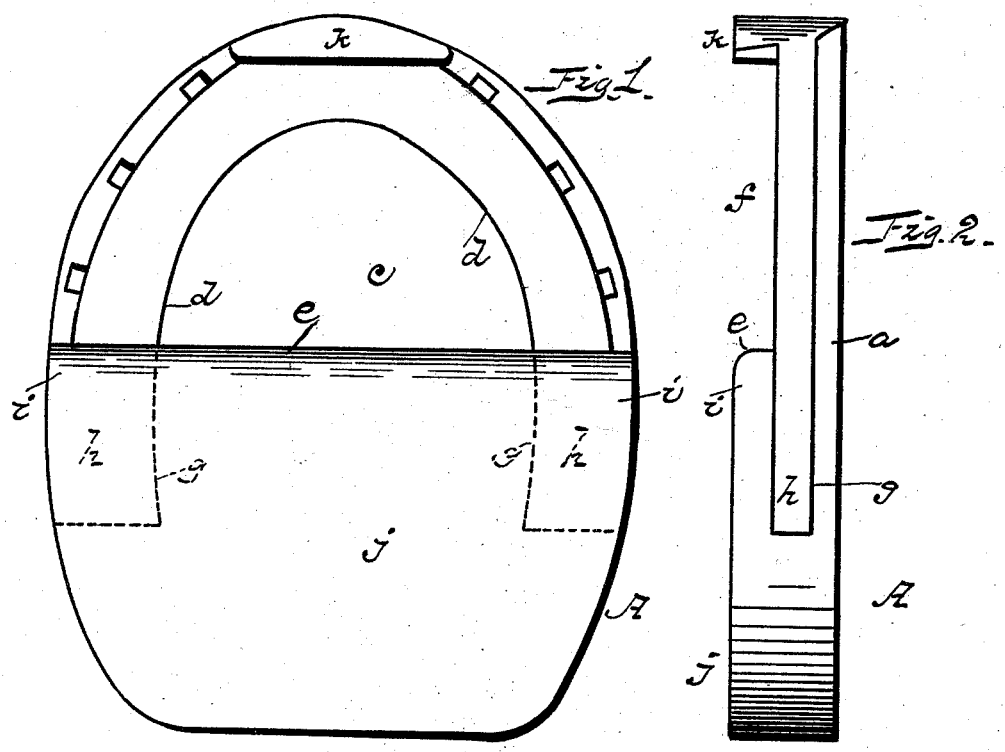
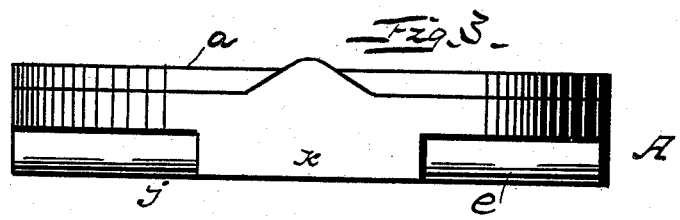
WITNESSES  
Jas. B. Clarke  
M. M. Morton  
INVENTOR  
James McCarthy  
by E. H. Bates, Attorney (No Model.) 2 Sheets—Sheet 2.
J. McCARTHY.
PAD FOR HORSESHOES.
No. 540,399. Patented June 4, 1895.
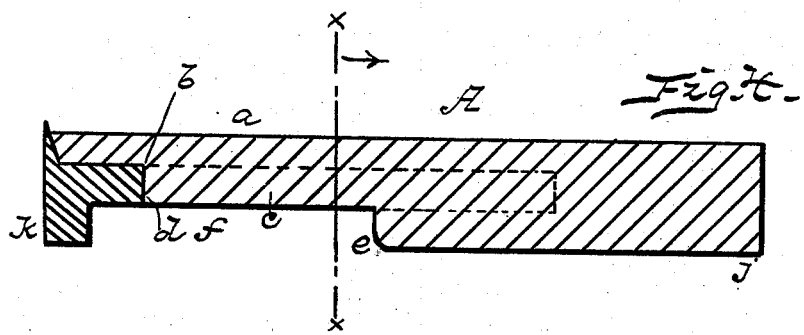
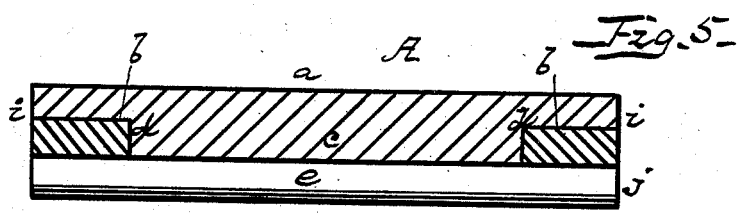

UNITED STATES PATENT OFFICE.

JAMES McCARTHY, OF NEW YORK, N. Y.

PAD FOR HORSESHOES.

SPECIFICATION forming part of Letters Patent No. 540,399, dated June 4, 1895.

Application filed March 7, 1895. Serial No. 540,858. (No model.)

*To all whom it may concern:*

Be it known that I, JAMES McCARTHY, a citizen of the United States, residing at New York, in the county of New York and State of New York, have invented certain new and useful Improvements in Pads for Horseshoes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to improvements in pads for horse shoes and it consists in the novel construction and arrangement of the same all as will be hereinafter fully explained.

The annexed drawings, to which reference is made, fully illustrates my invention, in which—

Figure 1 represents a bottom view of my device. Fig. 2 is a side view. Fig. 3 is a front view. Fig. 4 is a vertical longitudinal sectional view of the same; and Fig. 5 is a cross-sectional view taken on line $xx$; Fig. 4.

Referring by letter to the accompanying drawings, A designates the horse shoe pad, consisting of a flat upper portion $a$ which is designed to be placed next to the hoof of the horse and between the same and the horse shoe, being held to the hoof by the same nails which secure the shoe to the animal's hoof, and being the shape of the shoe.

This pad is provided with an off set or shouldered portion $b$ providing a central thickened portion $c$ which is designed to lie flush with the horse shoe, the shoulder $d$ thereof conforming to the inside shape of the shoe and against which the shoe rests.

At the bottom of the pad; that portion $j$ which comes in contact with the ground extends from the heel to about the center of the pad at a point between the toe and heel, the same having the shoulder $e$, leaving a space $f$ beneath the pad from said shoulder $e$ to the toe calk $k$ of the horse shoe. This calk of the shoe is designed to be on about the line with the flat bottom of the pad so that when the shoe and pad is on the animal's hoof he will rest on said toe and pad, the bearing portions thereof being a substitue for heel calks.

On each side of the pad, the bearing portion $i$, extends over the central portion which provides, in connection with the upper flat portion $a$, side recesses or grooves $g, g$, in which the ends $h, h$, of a three-quarter horse shoe extends, said ends being overlapped by the extension of the lower or tread portion of the pad. Thus it will be seen that the animal has his weight only upon the toe calk and the bearing portion of the pad, the heel or rear thickness thereof being equal to the toe calk, shoe and upper portion, and a pad as herein described not only relieves the animal's foot from jar or shock but it prevents him from slipping at the same time. The pad is designed to prevent, forward, backward, or lateral movement of the same, by the shoulders engaging the shoe and the recesses or grooves engaging the ends of the three quarter shoe, and a pad as herein described is durable and cheap to manufacture and can be made of leather, rubber or other suitable material.

Having thus described my invention, what I claim, and desire to secure by Letters Patent, is—

The combination with the horse shoe, of the pad A having the rear thickened or tread portion, the intermediate shouldered portion, the flat upper thin portion, and the overlapping forward ends of the tread portion providing recesses for the ends of the shoe, substantially as described.

In testimony whereof I affix my signature in presence of two witnesses.

JAMES McCARTHY.

Witnesses:
    EDWARD KILKEARY,
    JAMES E. McFADDEN.